(12) United States Patent
Takagi et al.

(10) Patent No.: US 7,460,183 B2
(45) Date of Patent: Dec. 2, 2008

(54) DIGITAL TELEVISION BROADCAST SIGNAL RECEIVER

(75) Inventors: Toshihiro Takagi, Daito (JP); Masanori Kawai, Daito (JP); Naoki Yamamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 768 days.

(21) Appl. No.: 11/116,383

(22) Filed: Apr. 28, 2005

(65) Prior Publication Data

US 2005/0246744 A1 Nov. 3, 2005

(30) Foreign Application Priority Data

Apr. 28, 2004 (JP) ............... 2004-132345

(51) Int. Cl.
*H04N 7/20* (2006.01)
*H04N 5/50* (2006.01)
*H04N 5/46* (2006.01)

(52) U.S. Cl. ............... 348/725; 348/570; 348/731; 725/72

(58) Field of Classification Search ............... 348/570, 348/725, 180, 192, 731, 732; 725/72; 455/161.3, 455/184.1, 185.1, 186.1, 226.1–226.4, 277.2; 342/371, 372; 343/735, 818, 838
See application file for complete search history.

(56) References Cited

U.S. PATENT DOCUMENTS

| | | | | |
|---|---|---|---|---|
| 6,400,320 | B1 * | 6/2002 | Stilp et al. | 342/457 |
| 2003/0016174 | A1 * | 1/2003 | Anderson | 342/378 |
| 2003/0160719 | A1 * | 8/2003 | Hancock | 342/368 |
| 2004/0248517 | A1 * | 12/2004 | Reichgott et al. | 455/63.4 |
| 2005/0181733 | A1 * | 8/2005 | Zangi et al. | 455/67.11 |

FOREIGN PATENT DOCUMENTS

| | | |
|---|---|---|
| EP | 1 267 443 | 12/2002 |
| JP | 05-232205 | 9/1993 |
| JP | 2003-60423 | 2/2003 |

* cited by examiner

*Primary Examiner*—Victor R Kostak
(74) *Attorney, Agent, or Firm*—Crowell & Moring LLP (57) ABSTRACT

In a digital TV broadcast signal receiver connected to a multi-directional antenna called smart antenna, having a first number, for example, sixteen of signal receiving directions defined in a technical standard such as EIA-909, a simplified multi-directional antenna having a second number, for example, four or eight signal receiving directions smaller than the first number is connectable. When a multi-directional antenna is connected, an initial processing is performed for confirming a number of signal receiving directions of the multi-directional antenna. When the multi-directional antenna is simplified one, the digital TV broadcast signal receiver treats the signal receiving directions more than two showing substantially the same signal sensing conditions as the same direction. Therefore, a number of times for switching the effective signal receiving direction of the multi-directional antenna can be reduced without switching indistinctive signal receiving directions in practice.

7 Claims, 5 Drawing Sheets

DIGITAL TELEVISION BROADCAST SIGNAL RECEIVER

BACKGROUND OF THE INVENTION

1. Field of the Invention

The present invention relates to a digital television (TV) broadcast signal receiver that can receive digital television broadcast signals such as ATSC (Advanced television systems Committee).

2. Description of the Related Art

In the North American Continent where an ATSC digital television broadcast (it is abbreviated to a hereinafter TV broadcast) is performed, plains are dotted with metropolises, so that various TV broadcast signals broadcasted in the suburbs of each metropolis can be received at other cities or the halfway point of the cities. In consideration from a user who receives the TV broadcast signals, since many TV broadcast signals are transmitted in various directions, it is necessary to regulate a direction of an antenna in an orientation to a TV broadcasting station from which a program which he wants to watch is delivered. Therefore, a multi-directional antenna such as a smart antenna is put into practical use.

With respect to an apparatus for controlling a signal receiving direction of an antenna, Publication of Japanese Patent Application No. 5-232205 shows an apparatus mounted on a moving body such as a vehicle for following a communication satellite. Publication of Japanese Patent Application No. 2003-60423 shows a smart antenna used for communicating between a mobile phone and a base station.

According to the EIA-909 technical standard, it is provided that a smart antenna has sixteen signal receiving directions in respective directions where a circle is divided into sixteen. However, there are simplified multi-directional antennas having four or eight signal receiving directions. On the other hand, a digital TV broadcast signal receiver in compliance with the EIA-909 technical standard can switch an effective signal receiving direction of the multi-directional antenna such as the smart antenna to one of all the sixteen signal receiving directions.

When the simplified multi-directional antenna having, for example, eight signal receiving direction is connected to the digital TV broadcast signal receiver, the same signals are outputted from adjoining two signal receiving directions, since the multi-directional antenna has only eight signal receiving directions though the digital TV broadcast signal receiver can switch sixteen signal receiving directions.

In addition, there are digital TV broadcast signal receivers having an automatic scanning function for selecting a signal receiving direction of the multi-directional antenna in which a TV broadcast signal of a channel chosen by a user can be received at the best condition. In general, an antenna of a TV station, that is, a position of a TV tower is invariance. Thus, a TV broadcast signal of each channel is searched in each sixteen signal receiving direction as an initial processing of the digital TV broadcast signal receiver, and a signal receiving direction, in which the signal receiving condition is the most suitable, is set as an optimum signal receiving direction of each channel. For example, in the United States, a TV station can be established relatively easier. In contrast, a TV station suddenly becomes bankrupt. Therefore, it happens that a new channel, which cannot be received beforetime, can be received, or an old channel receivable long before cannot be received. Furthermore, a signal receiving condition of a TV broadcast signal of a channel is varied due to construction of a high-rise building. Thus, it becomes necessary to reset an optimum signal receiving direction for receiving a TV broadcast signal of a channel chosen by a user. When a simplified multi-directional antenna is connected to a digital TV broadcast signal receiver with automatic scanning function, the digital TV broadcast signal receiver performs the scanning operation to search an optimum signal receiving direction of each channel to indistinctive signal receiving directions in practice. Consequently, time and energy are wasted for deciding the optimum signal receiving direction of each channel.

SUMMARY OF THE INVENTION

A purpose of the present invention is to provide a digital TV broadcast signal receiver, by which a term necessary for deciding an optimum signal receiving direction of each channel can be shortened, and a number of times for switching effective signal receiving direction can be reduced without performing scanning operation to indistinctive signal receiving directions in practice, when a simplified multi-directional antenna is connected thereto.

A digital TV broadcast signal receiver in accordance with an aspect of the present invention is connected to a multi-directional antenna having a first number of signal receiving directions in compliance with a predetermined technical standard, and receives a digital TV broadcast signal by making only one signal receiving direction among the first number of signal receiving directions effective.

The digital TV broadcast signal receiver comprises a tuner for receiving a TV broadcast signal through the multi-directional antenna, and a controller for switching an effective signal receiving direction of the multi-directional antenna, measures a signal receiving condition of a TV broadcast signal received by the tuner, and comparing a plurality of signal receiving conditions.

When a multi-directional antenna is connected to the tuner, the tuner receives TV broadcast signals of an optional channel and the controller measures signal receiving conditions of the TV broadcast signals in all of the first number of signal receiving directions while switching the effective signal receiving direction of the multi-directional antenna at an interval necessary for switching the effective signal receiving direction of the multi-directional antenna, and the controller compares the signal receiving conditions in each adjoining two signal receiving directions.

When the signal receiving conditions in at least two pairs of adjoining two signal receiving directions are substantially the same, the controller judges that the multi-directional antenna has a second number of signal receiving directions smaller than the first number, and treats the signal receiving directions of the multi-directional antenna showing substantially the same signal receiving conditions of the TV broadcast signals as the same direction.

By such a configuration, when the multi-directional antenna having a second number of the signal receiving directions smaller than the first number of signal receiving directions is connected to the tuner of the digital TV broadcast signal receiver, even though the digital TV broadcast signal receiver can switch the effective signal receiving direction of the antenna to all of the first number of the signal receiving directions, only one signal receiving direction among adjoining signal receiving directions more than two showing substantially the same signal receiving conditions is made effective so as to receive the TV broadcast signal. Consequently, it is possible to shorten a term necessary for deciding an optimum signal receiving direction of each channel, and to reduce a number of times for scanning signal receiving directions without performing scanning operation to indistinctive signal receiving directions in practice, when a simplified multidirectional antenna is connected the digital TV broadcast signal receiver in compliance with the technical standard. The number of the signal receiving directions of the multi-directional antenna is not limited to an even number.

Furthermore, when it is judged that the multi-directional antenna has the second number of signal receiving directions, it is possible that the controller makes only one of at least adjoining two signal receiving directions, in which the signal receiving conditions are substantially the same, effective so as to receive the TV broadcast signal through the tuner.

Furthermore, it is possible that the controller measures an sensitivity of a TV broadcast signal in each signal receiving direction with respect to each channel, compares values of measured sensitivities with each other, and decides a direction in which the value of the measured sensitivity is largest as an optimum signal receiving direction of each channel.

Still furthermore, it is possible that the controller can perform an automatic scanning operation for switching the effective signal receiving direction of the multi-directional antenna to a signal receiving direction, in which the signal receiving condition of an optional channel is highest.

DETAILED DESCRIPTION OF THE EMBODIMENT

Figure 1:
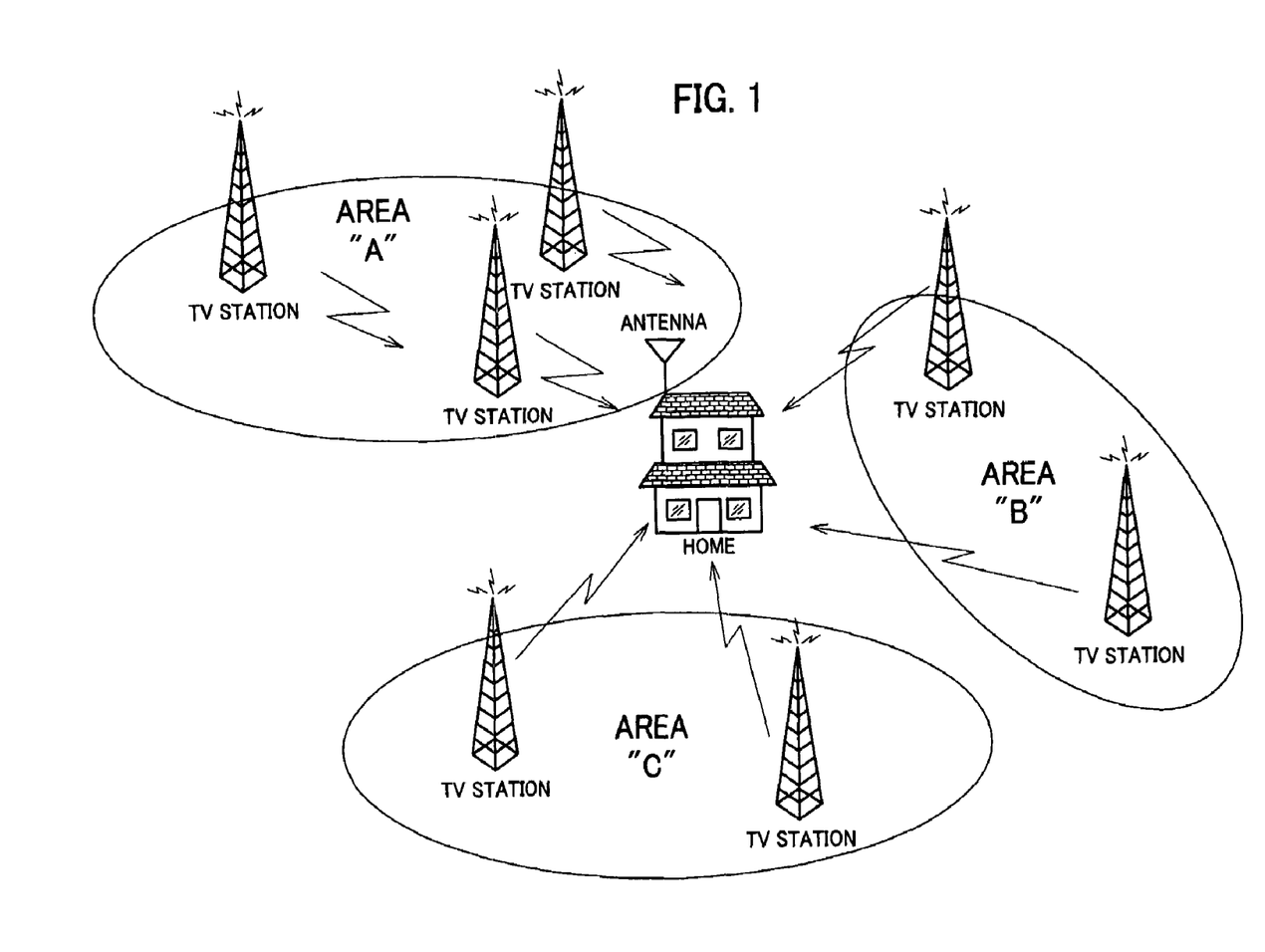
FIG. 1 is a conceptual diagram showing a circumstance for receiving digital television (TV) broadcast signals in home.

A digital TV broadcast signal receiver in accordance with an embodiment of the present invention is described with reference to figures. A circumstance for receiving TV broadcast signals in home is shown in FIG. 1. In an area where grand-based digital TV broadcast is performed, when a sensitivity of received signal of a TV broadcast signal is equal to or larger than a predetermined threshold value, an image having a predetermined image quality can be obtained by correction. Thus, it is possible to view TV programs by receiving TV broadcast signals which are delivered from TV stations existing at many positions in such as areas designated by symbols A, B, C, and so on, as shown in FIG. 1. According to such a circumstance, various types of multi-directional antennas called smart antenna having a plurality of signal receiving directions are put into practical use.

The digital TV broadcast signal receiver 1 can receive analogue TV broadcast signals, and it performs a control of optimum signal receiving directions of the analogue TV broadcast signals without performing scanning operation to indistinctive signal receiving directions in practice, when a simplified multi-directional antenna is connected thereto, similar to the digital TV broadcast signals. Accordingly, when there is no need to distinguish from the analogue TV broadcast signal(s) from the digital TV broadcast signal(s), in particular, it is described simply as TV broadcast signal(s).

As a configuration of the multi-directional antenna, there are many types, for example, for rotating an antenna with a motor for changing the signal receiving direction, or having a plurality of signal receiving directions and electronic switches and selecting an effective signal receiving direction by switching on and off of the electronic switches. In addition, according to the EIA-909 technical standard, it is defined that a number of the signal receiving directions of the multi-directional antenna is defined as sixteen. It, however, is provided that a multi-directional antenna having four or eight signal receiving directions, in consideration of user's needs, price, and so on. In contrast, a digital TV broadcast signal receiver in compliance with the EIA-909 technical standard must be able to switch all of sixteen signal receiving directions with no relation to kind or number of signal receiving directions of the multi-directional antenna connected thereto. Thus, when the simplified multi-directional antenna having four or eight signal receiving directions is connected to the digital TV broadcast signal receiver in compliance with the EIA-909 technical standard, the switching operation of the effective signal receiving direction is performed to adjoining two or four signal receiving directions which are indistinctive in practice.

The digital TV broadcast signal receiver in accordance with this embodiment receives a TV broadcast signal of an optional channel in each of sixteen signal receiving directions defined in the technical standard, and measures signal receiving condition in each signal receiving direction, when a multi-directional antenna is connected thereto. Subsequently, the digital TV broadcast signal receiver compares the signal receiving condition in each of sixteen signal receiving directions with the signal receiving condition in an adjoining signal receiving direction thereof, and judges whether the multi-directional antenna connected thereto is a standard type multi-directional antenna having sixteen signal receiving directions as defined in the technical standard or a simplified multi-directional antenna having only four or eight signal receiving directions. When it is judged that the simplified multi-directional antenna is connected, the digital TV broadcast signal receiver performs a control suitable for the simplified multi-directional antenna.

Figure 2:
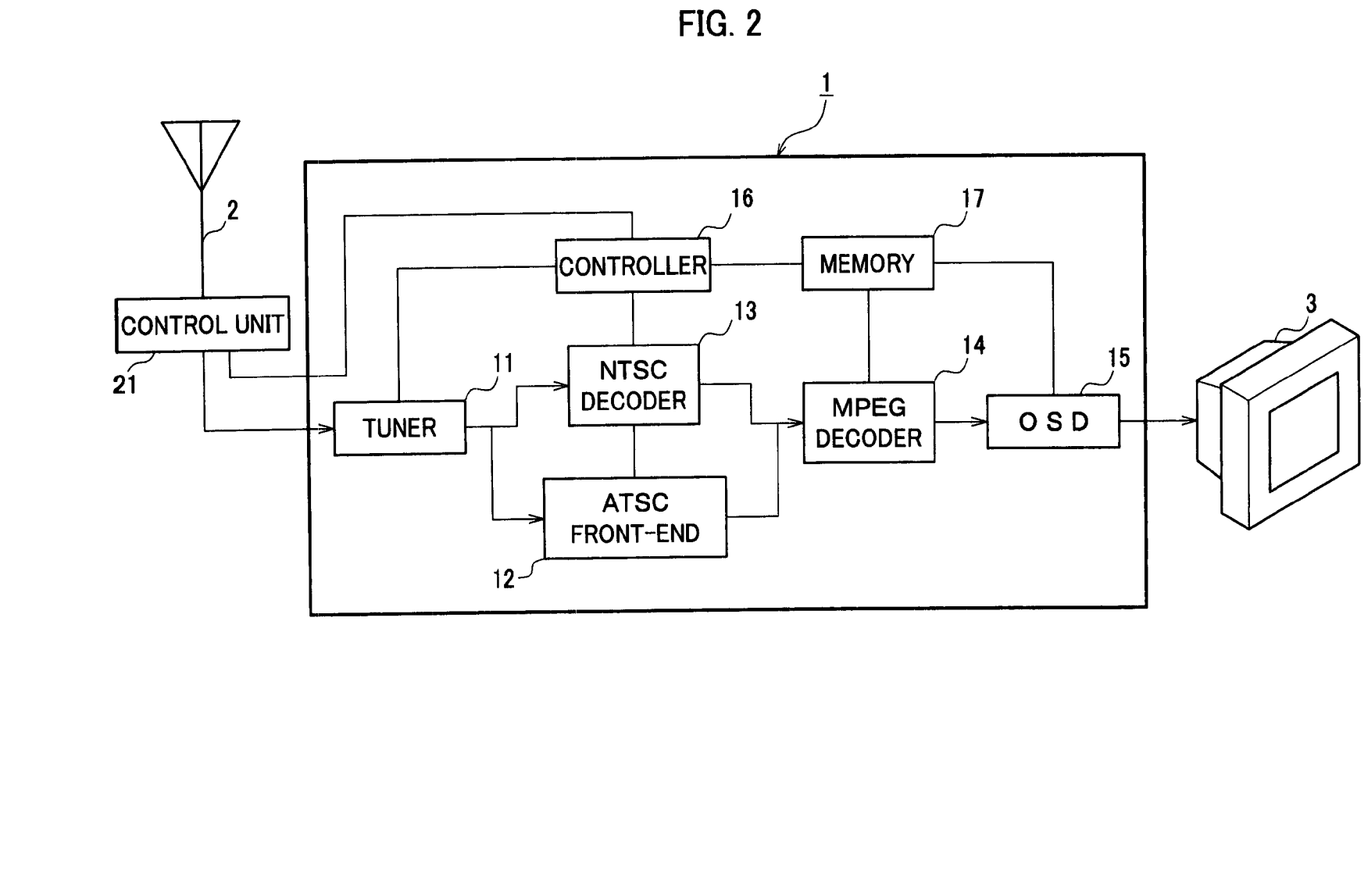
FIG. 2 is a block diagram showing a configuration of a digital TV broadcast signal receiver in accordance with an embodiment of the present invention.

A configuration of the digital TV broadcast signal receiver 1 in accordance with this embodiment is shown in FIG. 2. The digital TV broadcast signal receiver 1 comprises a tuner 11 serving as a TV broadcast signal receiving means which is connected to a multi-directional antenna 2, an ATSC front-end 12 serving as a digital signal processing means for processing predetermined signal processing to digital TV broadcast signals received by the tuner 11, and decoding the processed signals, an NTSC decoder 13 serving an analogue signal processing means for decoding analogue TV broadcast signals received by the tuner 11, an MPEG decoder 14 serving as signal output means for decoding MPEG compressed TV broadcast signals, an on screen display unit (OSD) 15 for superimposing a predetermined display image onto the decoded TV broadcast signals, a controller (CPU) 16 serving as entire control means for sensing signal receiving condition of the TV broadcast signals received by the tuner 11, for controlling a control unit 21 of the multi-directional antenna 2 (serving as a signal receiving direction deciding means and a control signal output means), and for controlling the ATSC front-end 12, the NTSC decoder 13, and so on, and a memory 17 serving an memory means for temporarily memorizing the decoded TV broadcast signals and for memorizing the display image to be superimposed on the decoded TV broadcast signals. The decoded TV broadcast signals decoded by the MPEG decoder 14 is outputted to a monitor display apparatus 3 through the on screen display unit 15, so that the image is displayed on the screen of the monitor display apparatus 3.

In the digital TV broadcast, data can be transmitted from the digital TV broadcast signal receiver 1 at user side to the TV station. It, however, is nothing to the present invention directly, so that the description of it is omitted.

The control unit 21 of the multi-directional antenna 2 makes only one signal receiving direction among a plurality of the signal receiving directions, which is chosen by the controller 16, effective, corresponding to the control signal outputted from the controller 16. When the multi-directional antenna 2 rotates an antenna with a motor in order to change the signal receiving direction, the control unit 21 controls the motor to orientating the antenna corresponding to the direction selected by the controller 16. Alternatively, when the multi-directional antenna 2 switches on and off of electronic switches in order to switch the effective signal receiving direction, the control unit 21 switches on only one electronic switch corresponding to the direction selected by the controller 16 and off the other electronic switches.

Figure 3:
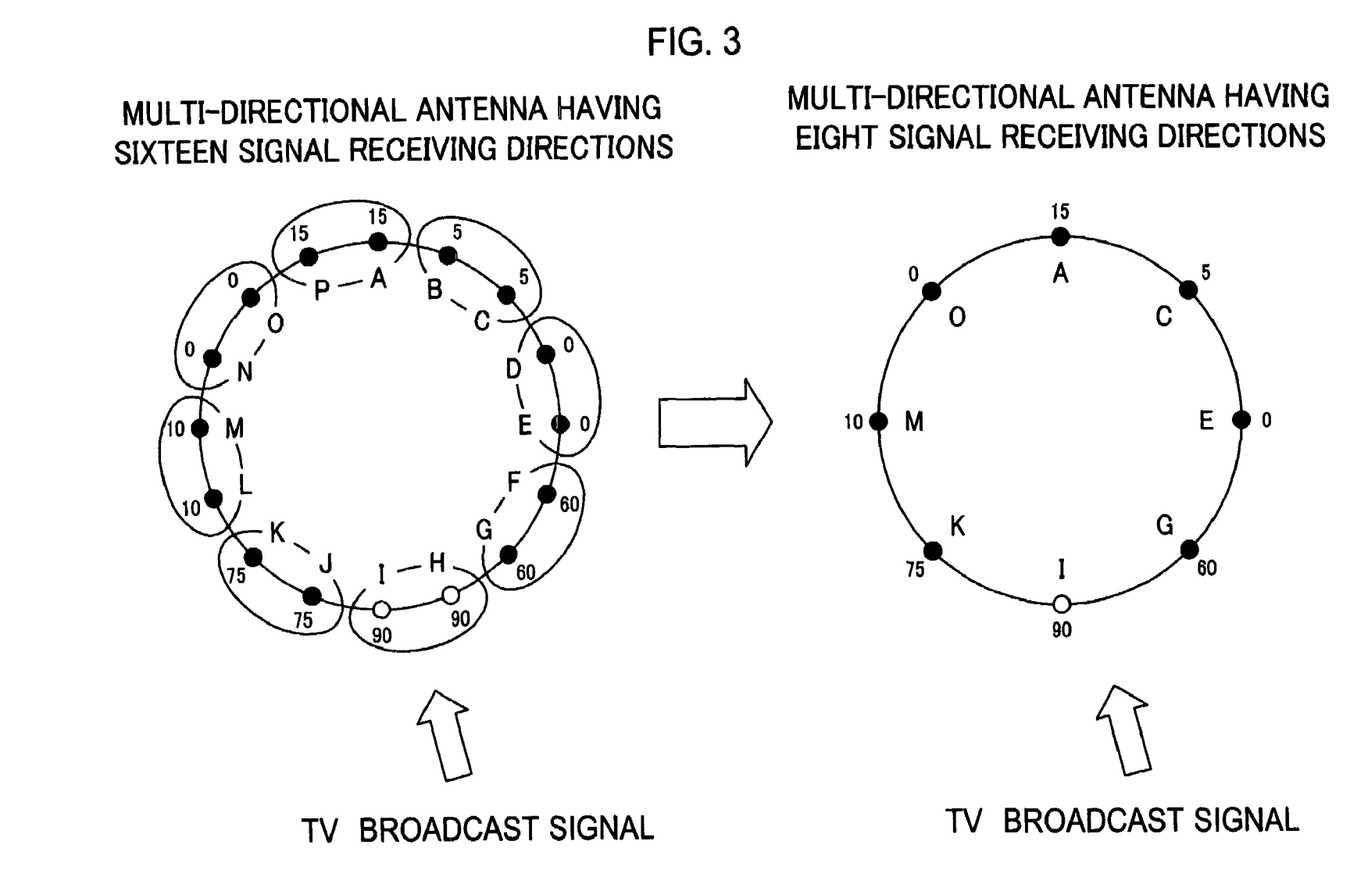
FIG. 3 is a conceptual diagram showing an example of signal receiving conditions of a TV broadcast signal of a channel when a multi-directional antenna has eight signal receiving directions, and a concept for controlling eight signal receiving directions of the multi-directional antenna by the digital TV broadcast signal receiver.

For example, in a simplified multi-directional antenna having eight signal receiving directions, the digital TV broadcast signal receiver 1 allocates eight pairs of adjoining two signal receiving directions in clockwise direction or in counterclockwise direction with respect to an optional signal receiving direction among sixteen signal receiving directions defined in the EIA-909 technical standard to eight signal receiving directions of the simplified multi-directional antenna. An example of signal receiving conditions of a TV broadcast signal of a channel in eight signal receiving directions of the simplified multi-directional antenna is shown in FIG. 3. In FIG. 3, symbols "A" to "P" respectively show the sixteen signal receiving directions defined in the EIA-909 technical standard. Each numeral shows sensitivity of received TV broadcast signal of an optional channel in each signal receiving direction. As can be seen from FIG. 3, the sensitivities of the TV broadcast signals outputted from adjoining two signal receiving directions, that is, the signal receiving conditions are the same. In addition, the signal receiving directions designated by symbols "H" and "I" showing the largest numeric values of the sensitivities of the TV broadcast signals corresponds to the optimum signal receiving direction of the channel. Substantially the same goes for a simplified multi-directional antenna having four signal receiving directions.

Figure 4:
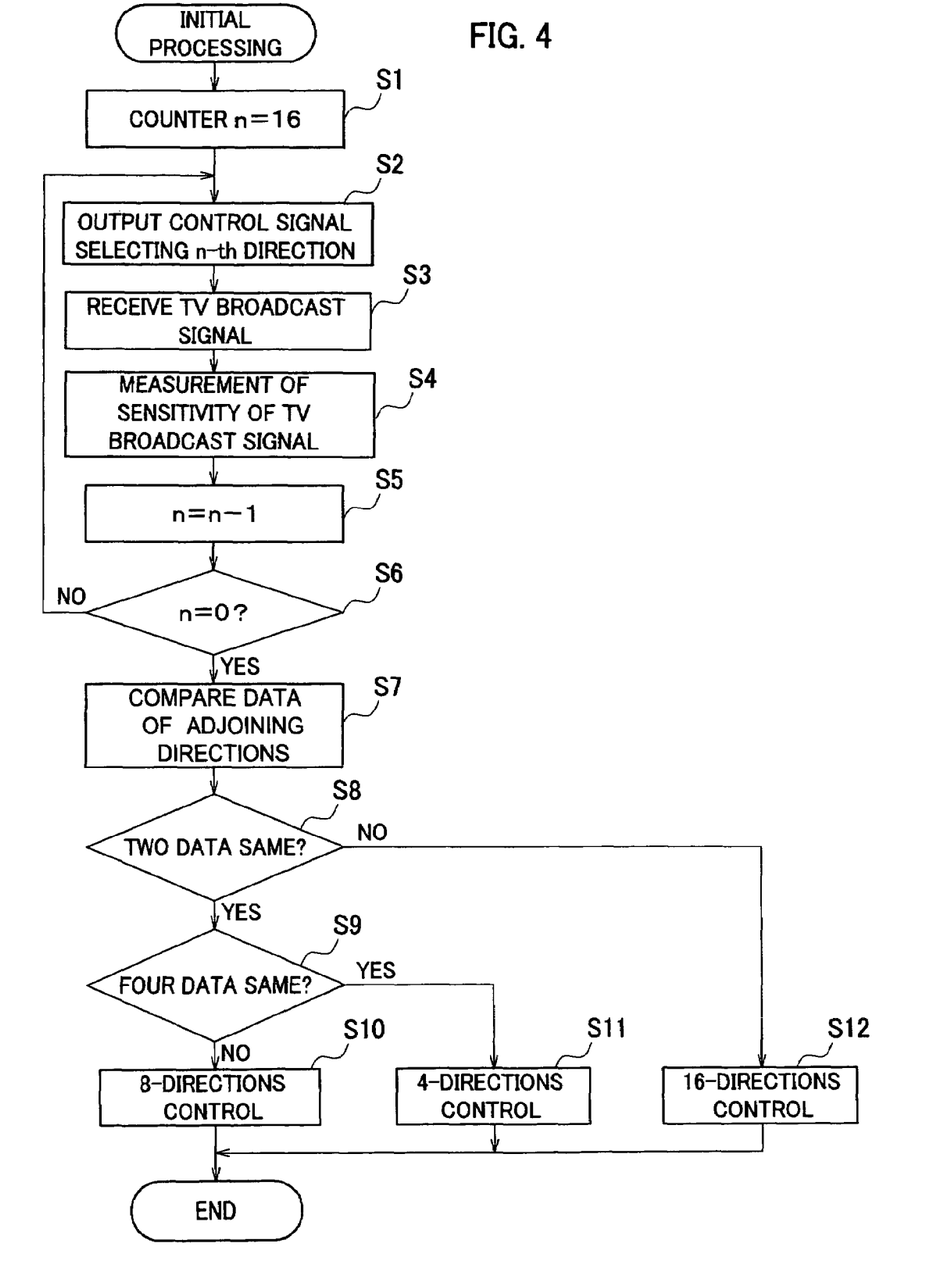
FIG. 4 is a flowchart showing a process for confirming a number of signal receiving directions of a multi-directional antenna in the digital TV broadcast signal receiver.

Subsequently, a control operation for signal receiving direction of the multi-directional antenna 2 through the controller 16 of the digital TV broadcast signal receiver is described with reference to the above-mentioned FIG. 3 and a flowchart shown in FIG. 4.

When the controller 16 senses that the multi-directional antenna 2 is connected to the tuner 11, the controller 16 performs an initial processing for confirming a number of signal receiving directions of the multi-directional antenna 2. The controller 16 sets a numeric value n=16 in a counter (S1), and outputs a control signal for selecting the n-th direction to the control unit 21 of the multi-directional antenna 2 (S2). After outputting the control signal to the control unit 21 of the multi-directional antenna 2, and passing a term necessary for switching the effective signal receiving direction of the multi-directional antenna 2, the TV broadcast signal of a optional channel is received through the tuner 11 (S3). When the TV broadcast signal is received, the controller 16 measures an sensitivity of received TV broadcast signal, and memorizes a measurement data of sensitivity into the memory 17 (S4).

Subsequently, the controller 16 subtracts a value one from the numeric value of the counter (S5), and judges whether the measurement of the sensitivity of the TV broadcast signal in each channel of sixteen signal receiving directions has been completed or not (S6). When the measurement of the sensitivity of the TV broadcast signal in each of sixteen signal receiving directions has not been completed, the controller 16 returns to the step S2, and measures the sensitivity of the TV broadcast signal in next signal receiving direction ((n−1)-th direction).

When the measurement of the sensitivity of the TV broadcast signal in each of the sixteen signal receiving directions has been completed (YES in S6), the controller 16 reads out the measured data of sensitivities memorized in the memory 17 and compares two data of sensitivities of each adjoining two signal receiving directions with each other (S7 and S8). When the data of sensitivities of adjoining two signal receiving directions are substantially the same (YES in S8), the controller 16 further judges whether the data of each adjoining four signal receiving directions are substantially the same or not (S9). When the data of adjoining four signal receiving direction are not substantially the same, the controller 16 judges the multi-directional antenna 2 has eight signal receiving directions, and performs the control for eight signal receiving directions, shown in FIG. 3 (S10). Alternatively, when the data of sensitivities of adjoining four signal receiving direction are substantially the same, the controller 16 judges the multi-directional antenna 2 has four signal receiving directions, and performs the control for four signal receiving directions (S11). Furthermore, when the data of sensitivities of adjoining two signal receiving direction are not substantially the same in the step S8 (NO in S8), the controller 16 judges the multi-directional antenna 2 has sixteen signal receiving directions, and performs the control for sixteen signal receiving directions (S12).

Figure 5:
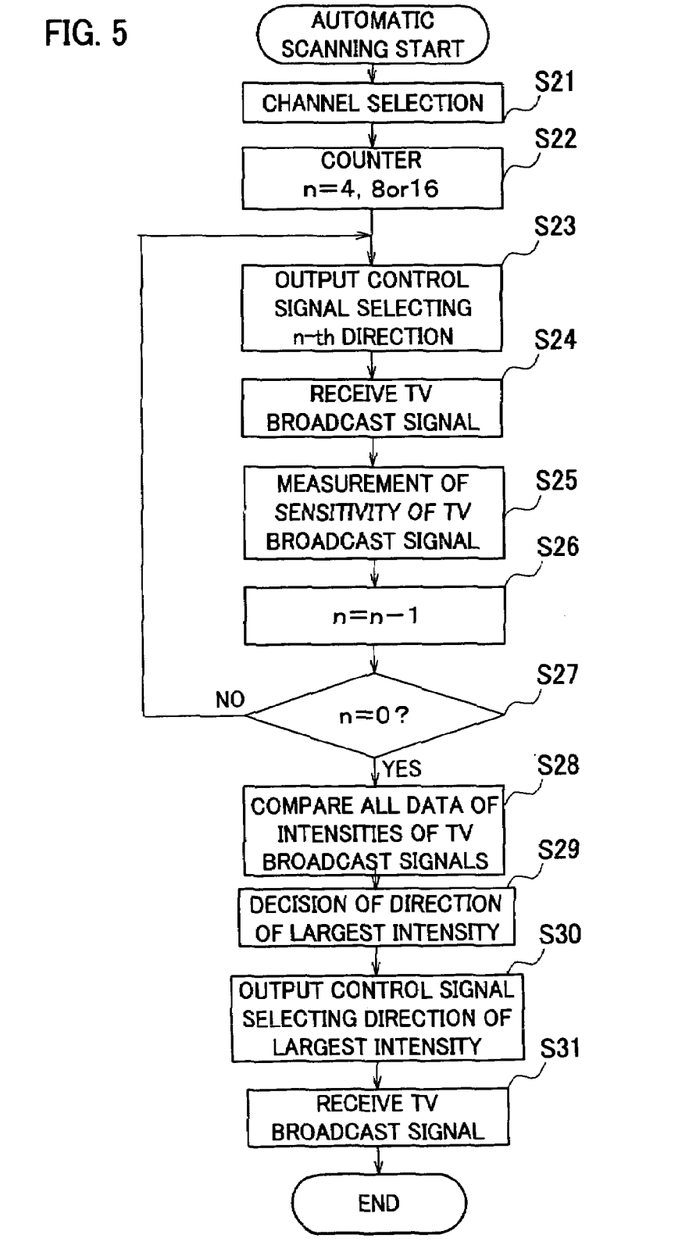
FIG. 5 is a flowchart showing automatic scanning operation in the digital TV broadcast signal receiver.

Subsequently, an automatic scanning operation of the digital TV broadcast signal receiver 1 is described with reference to a flowchart shown in FIG. 5. When a user selects an automatic scanning mode, and selects a channel to be viewed (S21), the controller 16 sets the initial value of the counter to one among the numeric value of 4, 8 and 16 corresponding to the number of signal receiving directions of the multi-directional antenna 2, following to a control method decided the above-mentioned initial processing (S22). Then, the controller 16 outputs a control signal for selecting the n-th signal receiving direction (S22). After waiting the term necessary for switching the effective signal receiving direction of the multi-directional antenna 2, the tuner 11 receives the TV broadcast signal of the optional channel (S24). Subsequently, the controller 16 measures the sensitivity of the received TV broadcast signal, and memorizes the measured data of sensitivity into the memory 17 (S25). The controller 16 subtracts one from the numeric value of the counter (S26), and judges whether the measurement of the sensitivities of the TV broadcast signals in all the signal receiving directions of the multi-directional antenna 2 has been completed or not (S27). When the measurement of the sensitivities of the TV broadcast signals in all signal receiving directions has not been completed, the controller 16 returns to the step S23, and measures the sensitivity of the TV broadcast signal in next signal receiving direction.

When the measurement of the sensitivities of the TV broadcast signals in all signal receiving directions has been completed (YES in S27), the controller 16 reads out the measured data of sensitivities memorized in the memory 17, compares all the data of sensitivities with each other (S28), and decides the largest value among the measured data of sensitivities, that is, a direction showing the largest sensitivity of the TV broadcast signal of the channel (S29). Subsequently, the controller outputs a control signal for selecting the signal receiving direction showing the largest sensitivity of the TV broadcast signal to the control unit 21 of the multi-directional antenna 2 (S30). After passing the term necessary for switching the effective signal receiving direction of the multi-directional antenna, the tuner 11 starts to receive the TV broadcast signal of the optional channel (S31).

The present invention, however, is not restricted by the above-mentioned description and illustration of the embodiment. When a multi-directional antenna is connected to the digital TV broadcast signal receiver, it is sufficient that the digital TV broadcast signal receiver receives TV broadcast signals of an optional channel and measures signal receiving conditions of the TV broadcast signals in all of a first number of signal receiving directions which is defined in a technical standard while switching the effective signal receiving direction of the multi-directional antenna at an interval necessary for switching the effective multi-directional antenna, and compares the signal receiving conditions in each adjoining two signal receiving directions. When the signal receiving conditions in at least two pairs of adjoining two signal receiving directions are substantially the same, it is possible to consider that the multi-directional antenna connected to the digital TV broadcast signal receiver has a second number of signal receiving directions smaller than the first number defined in the technical standard. Probably, the second number is a half or a quarter of the first number. The number of the signal receiving directions of the multi-directional antenna, however, is not limited to an even number. Then, the digital TV broadcast signal receiver can treat the signal receiving directions of the multi-directional antenna showing substantially the same signal receiving conditions of the TV broadcast signals as the same direction. Consequently, it is possible to shorten a term necessary for deciding an optimum signal receiving direction of each channel, and to reduce a number of times for scanning signal receiving directions without performing scanning operation to indistinctive signal receiving directions in practice, when a simplified multi-directional antenna is connected the digital TV broadcast signal receiver in compliance with the technical standard. Especially, it is more effective in an automatic scanning mode for searching an optimum signal receiving direction of a channel chosen by a user, since the term necessary for deciding the optimum signal receiving direction becomes a half or a quarter of the term in the conventional digital TV broadcast signal receiver.

In addition, for switching the effective signal receiving direction of the multi-directional antenna 2 to an optimum signal receiving direction of a channel chosen by a user, the digital TV broadcast signal receiver 1 does not necessarily perform an automatic scanning operation. The optimum signal receiving direction of each channel is previously sensed and memorized in the memory 17, and the effective signal receiving direction of the multi-directional antenna is switched to the optimum signal receiving direction of the channel to be switched corresponding to the data memorized in the memory 17. Specifically, the sensitivity of the TV broadcast signal of each receivable channel is measured in each signal receiving direction of the multi-directional antenna 2 confirmed in the above-mentioned initial processing of the digital TV broadcast signal receiver 1, and a direction showing the highest sensitivity of the TV broadcast signal of each channel is memorized in the memory 17 as the optimum signal receiving direction of each channel. When a user chooses a channel, the optimum signal receiving direction of the channel chosen by the user is read out from the memory 17, and a control signal for selecting the optimum signal receiving direction read out from the memory 17 is outputted to the control unit 21 of the multi-directional antenna 2. Since the signal receiving condition of each channel is not varied in the short term, the user can view an image of predetermined quality without performing the automatic scanning operation.

This application is based on Japanese patent application 2004-132345 filed Apr. 28, 2004 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A digital television broadcast signal receiver connected to a multi-directional antenna having a first number of signal receiving directions in compliance with a predetermined technical standard, receiving a digital television broadcast signal by making only one signal receiving direction among the first number of signal receiving directions effective, comprising:

a tuner for receiving a television broadcast signal through the multi-directional antenna;

a controller for switching an effective signal receiving direction of the multi-directional antenna, measures a signal receiving condition of a television broadcast signal received by the tuner, and comparing a plurality of signal receiving conditions; and wherein when a multi-directional antenna is connected to the tuner, the tuner receives television broadcast signals of an optional channel and the controller measures signal receiving conditions of the television broadcast signals in all of the first number of signal receiving directions while switching the effective signal receiving direction of the multi-directional antenna at an interval necessary for switching the effective signal receiving direction of the multi-directional antenna, and the controller compares the signal receiving conditions in each adjoining two signal receiving directions;

when the signal receiving conditions in at least two pairs of adjoining two signal receiving directions are substantially the same, the controller judges that the multi-directional antenna has a second number of signal receiving directions smaller than the first number, and treats the signal receiving directions of the multi-directional antenna showing substantially the same signal receiving conditions of the television broadcast signals as the same direction.

2. The digital television broadcast signal receiver in accordance with claim 1, wherein when it is judged that the multi-directional antenna has the second number of signal receiving directions, the controller makes only one of at least adjoining two signal receiving directions, in which the signal receiving conditions are substantially the same, effective so as to receive the television broadcast signal through the tuner.

3. The digital television broadcast signal receiver in accordance with claim 1, wherein the controller measures an sensitivity of a television broadcast signal in each signal receiving direction with respect to each channel, compares values of measured sensitivities with each other, and decides a direction in which the value of the measured sensitivity is largest as an optimum signal receiving direction of each channel.

4. The digital television broadcast signal receiver in accordance with claim 1, wherein the controller can perform an automatic scanning operation for switching the effective signal receiving direction of the multi-directional antenna to a signal receiving direction, in which the signal receiving condition of an optional channel is highest.

5. The digital television broadcast signal receiver in accordance with claim 1, wherein the second number is a half or a quarter of the first number.

6. A digital television broadcast signal receiver, to which a multi-directional antenna having sixteen signal receiving directions in compliance with a predetermined technical standard, receiving a digital television broadcast signal by making only one signal receiving direction among the sixteen signal receiving directions effective, comprising:

a control signal output means for outputting a control signal for directing a signal receiving direction to the multi-directional antenna so as to receive a television broadcast signal;

a television broadcast signal receiving means connected to the multi-directional antenna for receiving a digital television broadcast signal;

a signal processing means for performing a predetermined signal processing to the television broadcast signal received by the television broadcast signal receiving means;

a signal output means for outputting a signal processed by the signal processing means to a monitor display apparatus;

a memory means for temporarily memorizing the signal processed by the signal processing means;

a signal receiving direction deciding means for deciding an optimum signal receiving direction with respect to each receivable channel with using the signals memorized in the memory means; and an entire control means for controlling each component of the digital television broadcast signal receiver, and wherein a multi-directional antenna having only four or eight signal receiving directions can be connected to the digital television broadcast signal receiver;

when any multi-directional antenna is connected to the tuner, the control signal output means outputs control signals at a predetermined interval in a manner so that an effective signal receiving direction of the connected multi-directional antenna is serially switched to the sixteen signal receiving directions defined in the technical standard;

the television broadcast signal receiving means receives a television broadcast signal of an optional channel through the connected multidirectional antenna at the predetermined interval;

the signal receiving direction deciding means compares an sensitivity of a television broadcast signal in each of the sixteen signal receiving direction with a television broadcast signal in an adjoining signal receiving direction thereof;

when measured sensitivities of the television broadcast signal in adjoining two or four signal receiving directions defined in the technical standard are substantially the same, the signal receiving direction deciding means judges that the connected multi-directional antenna has only four or eight signal receiving directions; and when it is judged that the connected multi-directional antenna has only four or eight signal receiving directions, the control signal output means outputs a control signal in a manner so that a signal receiving direction of four or eight signal receiving directions disposed at an equal angle and among two or four signal receiving directions, in which the sensitivities of the television broadcast signals are substantially the same, makes effective.

7. The digital television broadcast signal receiver in accordance with claim 6, further comprising:

an automatic scanning mode automatically switching the effective signal receiving direction of the multi-directional antenna to a signal receiving direction, in which the sensitivity of the television broadcast signal is the largest; and wherein when a multi-directional antenna having only four or eight signal receiving directions is connected to the tuner and a user selects the automatic scanning mode, the signal receiving direction deciding means sensitivities of television broadcast signals of a channel chosen by the user in the four or eight signal receiving directions, judges a signal receiving direction, in which the sensitivity of the television broadcast signal is the largest, as an optimum signal receiving direction of the channel, and automatically switching the effective signal receiving direction of the multi-directional antenna to the optimum signal receiving direction so as to receive the television broadcast signal of the channel.

* * * * *